E. D. PRIEST.
DYNAMO ELECTRIC MACHINE.
APPLICATION FILED JUNE 1, 1917.

1,306,625.

Patented June 10, 1919.

Inventor:
Edward D. Priest,
by
His Attorney.

UNITED STATES PATENT OFFICE.

EDWARD D. PRIEST, OF SCHENECTADY, NEW YORK, ASSIGNOR TO GENERAL ELECTRIC COMPANY, A CORPORATION OF NEW YORK.

DYNAMO-ELECTRIC MACHINE.

1,306,625.　　　　Specification of Letters Patent.　　Patented June 10, 1919.

Application filed June 1, 1917. Serial No. 172,294.

*To all whom it may concern:*

Be it known that I, EDWARD D. PRIEST, a citizen of the United States, residing at Schenectady, in the county of Schenectady, State of New York, have invented certain new and useful Improvements in Dynamo-Electric Machines, of which the following is a specification.

My invention relates to dynamo electric machines and more particularly to coils for such machines and the method of making them.

If coils for a dynamo electric machine are wound up out of wire which is rectangular in cross-section, these coils have a better space factor in the core slot than if round wire was used. Attempts have been made in the past to wind coils out of wire rectangular in cross-section, but considerable difficulty has been experienced by reason of the fact that the wire tends to twist in winding the coil so that the end turns of the coil do not lie over each other closely; also, if the wires are twisted, it means that the wires may lie together corner to corner, instead of against flat faces, and this tends to cut the insulation when the coils are pressed together, and may produce a short circuit. Moreover, it is more expensive to wind a coil out of a rectangular wire, because care must be taken to see that the flat sides of the adjacent wires lie against each other in the slot portion.

In accordance with my invention, I form a coil of a plurality of round conductors in the usual manner, and after the coil is formed in this way, the sides of the portions of the coil, which are to be located in the core slot, are flattened by applying pressure only to the sides which will extend in the general direction of the radii of the core. In this way a coil which is substantially rectangular in cross-section is formed. By compressing the coils so as to make them narrow and deep, it is possible to use them in core members provided with narrow and deep slots, which is very advantageous because it permits the use of a large number of turns in a core member of small diameter.

Figure 1:
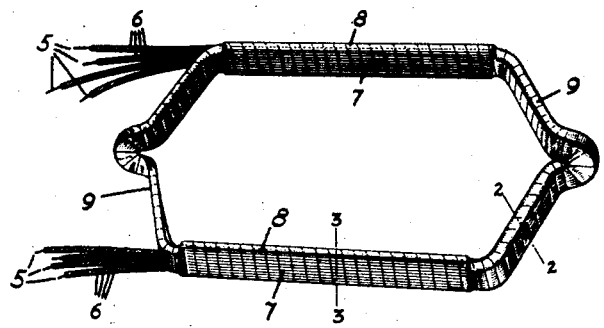
Figure 2:
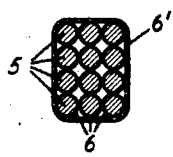
Figure 3:
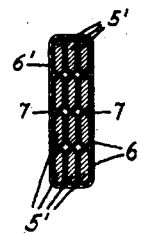

For a better understanding of my invention, reference may be had to the following description taken in connection with the accompanying drawing, in which Figure 1 is a perspective view of a coil made in accordance with my method; Fig. 2 is a section on the line 2—2 of Fig. 1; Fig. 3 is a section on the line 3—3 of Fig. 1, and Fig. 4 is a sectional view of a portion of a core member provided with by coils.

In the drawing, I have illustrated a coil formed of a plurality of round conductors 5, each of which is preferably surrounded with insulation 6 and the whole coil in surrounded by insulation 6', the sides 7, 7 of the portions 8 of the coil, which are to be located in the core slots, being flattened. These sides 7, 7 are flattened in any usual manner as by placing these portions of the coil between the jaws of a hydraulic press. In the coil shown, the portions 9 of the coil which are to be located beyond the core are not flattened, so that the conductors are round as shown in Fig. 2. Fig. 2 also represents the cross-section of the portions of the coil which will be located in the core slots before they have been flattened. Fig. 3 shows this portion of the coil after it has been flattened, the conductors being indicated by 5'. It will be seen from this figure that the coil is pressed only on two sides, so that the wires are not exactly rectangular in cross-section, but instead are flat on two sides and slightly round on the other two sides.

Figure 4:
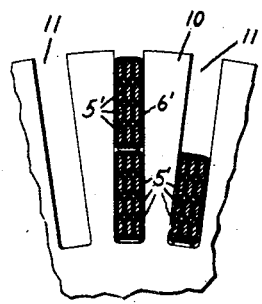

In Fig. 4, 10 represents a core member having deep, narrow slots 11. These slots are shown as being provided with my coils.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The method of making a coil for dynamo electric machines which consists in forming said coil of a plurality of round conductors, and then flattening the sides of the portions of said conductors which are to be located in the core slots by applying pressure only to the sides of the coil which will extend in the general direction of the radii of the core member.

2. In a dynamo electric machine, a core member provided with slots, coils therefor comprising a plurality of conductors, two sides only of the portions of each of said conductors which are located in the core slots being flattened, said flattened sides extending in the general direction of the radii of the core member.

3. In a dynamo electric machine, a core member provided with slots, coils therefor comprising a plurality of conductors, two sides only of the portions of each of said conductors which are located in the core slots being flattened, said flattened sides extending in the general direction of the radii of the core member, the portions of said conductors which extend beyond the core member being round.

4. In a dynamo electric machine, a core member provided with slots, coils therefor comprising a plurality of insulated conductors, two sides only of the portions of each of said conductors which are located in the core slots being flattened, said flattened sides extending in the general direction of the radii of the core member.

5. In a dynamo electric machine, a core member provided with slots, coils therefor comprising a plurality of insulated conductors, two sides only of the portions of each of said conductors which are located in the core slots being flattened, said flattened sides extending in the general direction of the radii of the core member, the portions of said conductors which extend beyond the core member being round.

In witness whereof, I have hereunto set my hand this 31st day of May, 1917.

EDWARD D. PRIEST.

Copies of this patent may be obtained for five cents each, by addressing the "Commissioner of Patents, Washington, D. C."